United States Patent

[11] 3,587,042

[72] Inventor Michael E. Mitchell
Syracuse, N.Y.

[21] Appl. No. 838,869
[22] Filed July 3, 1969
[45] Patented June 22, 1971
[73] Assignee General Electric Company

[54] RANDOM ERROR CORRECTING CODING AND DECODING SYSTEM HAVING INVERSION TOLERANCE AND DOUBLE CODE CAPABILITY
10 Claims, 3 Drawing Figs.

[52] U.S. Cl. .......... 340/146.1, 325/41
[51] Int. Cl. .......... G08c 25/00, H04l 1/10
[50] Field of Search .......... 340/146.1; 235/153; 325/41

[56] References Cited

UNITED STATES PATENTS

| | | | |
|---|---|---|---|
| 3,164,804 | 1/1965 | Burton, et al. | 340/146.1 |
| 3,222,644 | 12/1965 | Burton, et al. | 340/146.1 |
| 3,439,334 | 4/1969 | Massey | 340/146.1 |
| 3,469,236 | 9/1969 | Gallager | 340/146.1 |

*Primary Examiner*—Malcolm A. Morrison
*Assistant Examiner*—Charles E. Atkinson

*Attorneys*—Norman C. Fulmer, Carl W. Baker, Frank L. Neuhauser, Oscar B. Waddell and Joseph B. Formam

ABSTRACT: An improved error correcting coding and decoding system for reliable data transmission. During a first subcycle of decoder operation, estimator logic circuitry generates successive sets of estimator function bits from selected bits of a received code word, and a decision circuit generates successive test bits in accordance with a bit derived from a number of the estimator function bits. A modulo 2 adder compares the successive test bits with the corresponding received bits, and a counter circuit counts the number of disagreements. A disagreement count exceeding a predetermined number indicates that the received code word has become inverted, and circuitry then functions to correct for the inversion by either complementing the received code word before the second decoding subcycle or by complementing the output of the decoding decision circuit during the second subcycle. During the second decoding subcycle, the decision circuit generates successive decoded bits as determined from a majority of the estimator function bits and also from a code word bit if desired. In the event of a "tie" among the estimator bits, the indeterminate majority decision bit is replaced with the corresponding received bit. The encoding and decoding system may be used either for inversion tolerant coding and decoding of an appropriate code (such as the (21,11) code) or for noninversion tolerant coding and decoding of a related type of code (such as the (21,12) code).

INVENTOR:
MICHAEL E. MITCHELL,

BY Norman C. Fulmer
HIS ATTORNEY.

PATENTED JUN 22 1971

3,587,042

INVENTOR
MICHAEL E. MITCHELL,

BY Norman C. Fulmer
HIS ATTORNEY.

RANDOM ERROR CORRECTING CODING AND DECODING SYSTEM HAVING INVERSION TOLERANCE AND DOUBLE CODE CAPABILITY

BACKGROUND OF THE INVENTION

The invention is in the field of electronic systems for the transmission of information in the form of coded digital signals. The invention is particularly directed to error-correcting decoder circuits for decoding redundantly coded signals representing information such as computer data, telemetry information (for rockets and space stations, for example), stock market quotations, airline reservations, and other business and scientific data.

A frequently used technique for transmitting information, is to convert the information into a binary form consisting of "1" bits and "0" bits. These bits are frequently grouped into binary data words representing the elemental units of data to be transmitted. The type of coded information transmission system to which the invention best applies, employs an encoder at the transmitter which generates a number of extra (redundant) bits to be associated with each binary data word to form a code word for transmission, and employs a decoder at the receiver which decodes the received coded signals to recover the data words. Numerous error-correcting codes have been devised, having the general characteristic of adding redundant bits to the data words according to systematic rules so as to form code words such that, if during transmission a limited number of the bits in a code word becomes altered or obliterated due to static, noise, fading or other causes, the received code word will nonetheless differ from any other code word in a sufficient number of bits so that the decoder will be able to properly decode it into the correct binary data word.

One type of error-correcting system, described in U.S. Pat. No. 3,237,160 to Michael E. Mitchell and assigned to the same assignee as the present invention, employs a decoder at the receiver which functions to compare each incoming word with a code word vocabulary. By the process of correlation, the correct (or most likely correct) binary data word is selected and fed out of the decoder.

Another general type of error-correcting system, to which the present invention belongs, is described in U.S. Pat. Nos. 3,164,804 and 3,222,644 to Burton and Mitchell and assigned to the same assignee as the present invention. In this type of system, each received binary word is sequentially fed into a register, and "estimator" logic circuits generate output signals (estimators) in accordance with the contents of certain stages of the register. A majority logic circuit provides an output bit in accordance with the majority of the estimators. The register is then shifted one step and the foregoing sequence repeated, and so on, whereby the decoded data-word bits are obtained and fed out from the decoder.

A problem that arises when the coded word-bits are transmitted by efficient methods, is that the bits are likely to become inverted; that is, the 1's become 0's and the 0's become 1's. For example, for efficient transmission of the coded binary words via radio waves, over telephone lines, or other media (such as magnetic tape), suppressed carrier techniques are advantageously employed so that more of the available energy can be used for transmission of the modulation information and less energy is wasted on transmission of a carrier. However, in receivers that require a reconstituted carrier to be generated in correct phase with the suppressed carrier for achieving proper demodulation, it is necessary to transmit a residual carrier or pilot signal for maintaining the correct phase of the regenerated carrier. If this proper phasing is not maintained, the demodulated digits can become inverted (complemented), and unless a means is provided for detecting this event, the output of the demodulator will be ambiguous. Such transmission of a residual carrier or pilot signal undesirably increases the complexity of the system and also reduces the amount of available energy that can be utilized for transmitting the useful modulation information. Attempts to increase the relative amount of energy in the modulation increases the error probability and delay in detecting the proper carrier phase, particularly at the lower signal-to-noise ratios. The foregoing difficulties of suppressed carrier techniques also arise if suppressed subcarriers are utilized with, or in lieu of, suppressed carrier transmission. The alternative of using differentially coded transmission (such as by representing a "1" with a phase shift and a "0" with the absence of a phase shift) has been extensively used as a means of resolving the 1—0 ambiguity without transmitting residual carrier or other reference signals. However, this can convert isolated bit errors into double adjacent bit errors, and the use of differentially coherent recovery of the received digits causes an objectionable degradation in receiver performance.

An improved method of correcting or compensating for the aforesaid inversion of the code digits, is to employ estimator logic circuits in the decoder which generate estimator bits from an even number of bits selected from the received code word, as will be described in detail subsequently herein.

SUMMARY OF THE INVENTION

Objects of the invention are to provide an improved error-correcting coding and decoding system, and to provide such a system which is inversion-tolerant whereby proper decoding is achieved without resorting to differential coding or differentially coherent demodulation and without the necessity of providing any residual carrier, subcarrier, pilot signal, or other special phasing means for reinsertion of a regenerated carrier. Another object is to provide a system having double code capability for the encoding and decoding processing of alternative codes.

The invention comprises, briefly and in a preferred embodiment, a code word encoder and an error-correcting decoder circuit for generating and decoding digital coded signals of the type comprising data bits accompanied by redundant bits for error correction purposes. The decoder circuit includes a shift register into which a received code word is stored and subsequently shifted during the decoding operation. Logic circuits generate a plurality of bit estimator functions in a well-known manner, each from the contents of an even number of stages of the shift register, and the estimator bits are fed to a decision circuit for sequential determination of the most likely correct transmitted code bits. An additional estimator bit is fed to the decision circuit directly from the shift-register. In accordance with a feature of the invention, the decoding cycle for each code word comprises an inversion testing subcycle followed by an error correcting subcycle. During the inversion testing subcycle, a modulo 2 adder circuit is connected to successively compare the inversion test bits generated by the decision circuit with the successive bits in a certain stage of the shift register. These compared bits will be the same in the absence of inversion or error. A counter circuit is connected to the adder circuit and counts the number of disagreements of the compared bits. If these disagreements reach a predetermined number, it is assumed that the received code word has become inverted, and circuitry then functions to complement (invert) the shift register contents, or the decision circuit output bits, so as to correct for the inversion. During the second decoding subcycle, which performs the error-correcting function, the generation of estimator bits is continued, from which the decoded output bits are generated and fed out from the decoder. The adder (comparing) circuit and the counter circuit also function, in cooperation with other circuits, to provide an automatic capability for decoding either of two different codes, for example the (21, 11) code or the (21, 12) code.

DESCRIPTION OF THE PREFERRED EMBODIMENT

Figure 1:
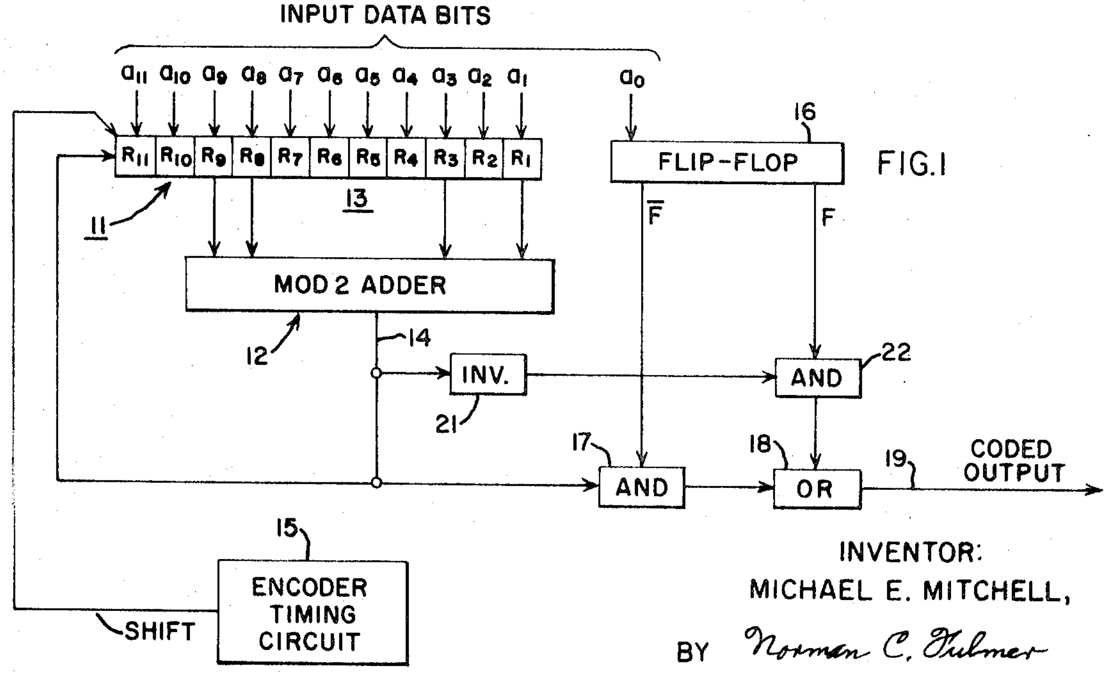
FIG. 1 is an electrical block diagram of an encoder for use with a preferred embodiment of the invention.

In the transmitter circuit of FIG. 1, a plurality of binary data bits $a_1$ through $a_{11}$ are respectively applied to stages $R_1$ through $R_{11}$ of a shift register 11. The contents of stages $R_1$, $R_3$, $R_8$, and $R_9$ are fed to a modulo 2 adder 12, the output of which is fed into stage $R_{11}$ of the shift register 11. The input data bits $a_1$ through $a_{11}$ each constitutes a binary "1" or "0", in standard binary parlance. The mod 2 adder 12 provides the mod 2 sum of the binary inputs. As is well known, mod 2 addition is the same as binary addition except that carries are ignored. The symbol for mod 2 addition is $\oplus$ and the possible summations of the various combinations of binary inputs are as follows:

$$0\oplus0=0$$
$$1\oplus1=0$$
$$0\oplus1=1$$
$$1\oplus0=1$$

The arrangement of the shift register 11 and mod 2 adder 12 together comprises an encoder 13 that can produce, at the output 14 of the adder 12, any word of the (21, 11) code, consisting of 21 bits per coded word of which the last 11 bits are data bits and the first 10 bits are redundant bits added for coding purposes. The shift register 11 is sequentially shifted toward the right under control of a timing circuit 15, a step at a time, to produce the aforesaid coded output at 14. The code words comprising various other cyclic codes can be similarly produced. Other cyclic code encoders for producing redundant bits followed by the data bits are described in the book Error Correcting and Detecting Codes by W. W. Peterson (MIT Press and John Wiley & Sons, Inc., 1961) on pages 118, 119 and 148.

The encoder of FIG. 1 also can produce the (21, 12) code. The encoding procedure used for generating words of the (21, 12) code is based on the well known fact that the (21, 12) code consists of all the words of the (21, 11) code together with the complements of all (21, 11) code words.

When encoding the (21, 12) code, the encoder of FIG. 1 employs a 12th input data bit $a_0$ fed to a flip-flop circuit 16 having an uninverted output F which is 1 when $a_0$ is 1 and is 0 when $a_0$ is 0, and also having an inverted output $\overline{F}$ which is the complement of F. The output 14 of adder 12 is fed in succession to an AND gate 17 and an OR gate 18, to the encoder output 19, and also to an inverter 21 and AND gate 22, to a second input of the OR gate 18. The F and $\overline{F}$ outputs of flip-flop 16 are connected respectively to inputs of the AND gates 17 and 22. Whenever $a_0$ is 0, F is 0 and $\overline{F}$ is 1, whereby the AND gate 22 is gated OFF and the AND gate 17 is gated ON with the result that the adder output 14 is connected to the encoder output 19. Wherever $a_0$ is 1, F is 1 and $\overline{F}$ is 0, whereby the AND gate 17 is gated OFF and AND gate 22 is gated ON, with the result that the adder output bit at 14, inverted by inverter 21, is fed to the encoder output 19.

When sending the (21, 11) code, the input $a_0$ is held at 0 or the flip-flop 16 is latched to its state in which F is 0 and $\overline{F}$ is 1, whereby the (21, 11) code word from adder output 14 is fed to the encoder output 19 via AND gate 17 and OR gate 18.

Figure 2:
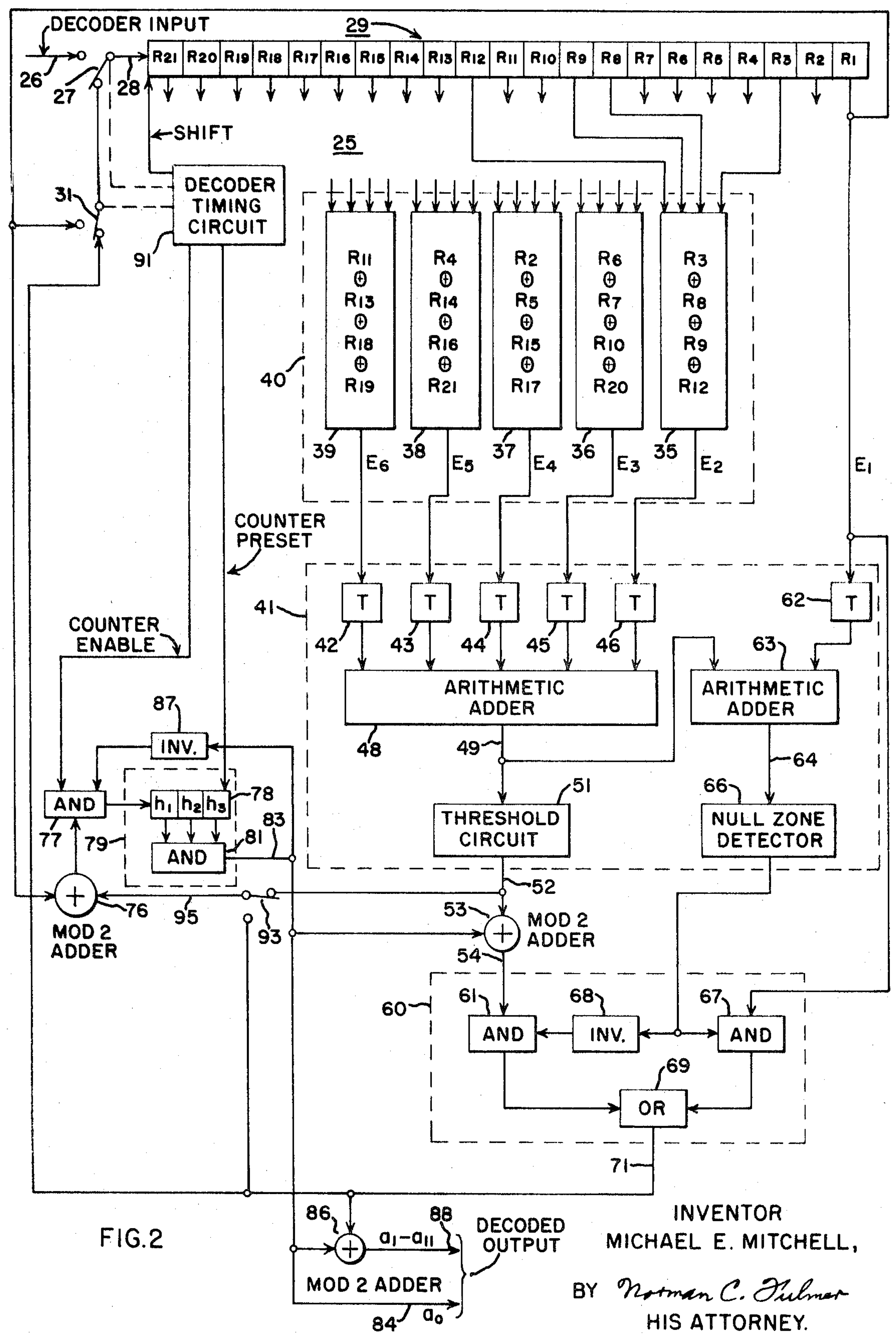
FIG. 2 is an electrical block diagram of a decoder in accordance with a preferred embodiment of the invention.

In the circuit of FIG. 2, the signal received from the circuit of FIG. 1 is fed, after detection and amplification if required, to a decoder circuit 25 via an input connection 26. An electronic switch 27 is arranged to temporarily connect the input connection 26 to the input 28 of a 21-stage shift register 29, allowing the 21 stages of shift register 29 to become loaded with the 21 bits of a received code word, the first ten bits being the redundant bits and the following eleven bits being data bits. The switch 27 then connects the shift register input 28 to the common terminal of a second electronic switch 31.

Five modulo 2 adder circuits 35, 36, 37, 38, and 39 are provided, and together constitute an estimator logic circuit 40. Four different stages of the shift register 29 are connected to each of the modulo 2 adders 35—39, as designated in FIG. 2. The output of stage $R_1$ of the shift register 29, and also the outputs of the five modulo 2 adders 35—39, designated $E_1$ through $E_6$, are connected to inputs of a decision circuit 41 which may include a majority logic circuit and also a tie detector circuit.

In the decision circuit 41, the five estimator bits $E_2$ through $E_6$ are fed through translators 42 through 46 which function to translate the "1" and "0" estimator bits into positive and negative signal pulses (or levels) which are applied as inputs to an arithmetic adder 48, the output 49 of which is applied to a threshold circuit 51 which produces at its output 52 a "1" or "0" signal representing the majority of the five estimator bits $E_2$ through $E_6$. This output 52 is applied to an input of a mod 2 adder 53, the output 54 of which is applied to an input of an AND circuit 61 of a tie resolving circuit 60. The $E_1$ data bit from stage $R_1$ of the shift register 29 is applied, via a translator 62, to an input of an arithmetic adder 63, another input thereto being connected from the output 49 of adder 48. The output 64 of the adder 63 is applied to a null zone detector 66, the output of which is fed to an AND gate 67 of the switch 60, and also through an inverter 68 to the remaining input of the AND gate 61. The received bit $E_1$, from stage $R_1$ of shift register 29, is applied to the remaining input of the AND gate 67. An OR circuit 69 has its inputs respectively connected to the outputs of the AND gates 61 and 67, the output 71 thereof constituting the output of the tie resolving circuit 60.

The output 64 of adder 63, and the functioning of the null zone detector 66, depends on the arithmetic combination of the output of translator 62 (derived from $E_1$) and the sum output 49 (derived from $E_2$ through $E_6$). For example, if the sum signal at 49 is at the plus 1 level and the $E_1$ bit as translated by translator 62 is at the minus 1 level, the output 64 of adder 63 will be in the zero or null zone (a tie of the estimator bits) and the null zone detector 66 will generate a "1" bit which will turn OFF the AND gate 61 and turn ON the AND gate 67, thereby breaking the tie by feeding the $E_1$ bit from shift register stage $R_1$ to the tie resolving circuit output 71 in lieu of the output 54 of mod 2 adder 53. When the estimator bit values $E_1$ through $E_6$ do not produce a tie, the null zone detector 66 output will be a 0 and the majority estimator bit at output 52 of threshold circuit 51 is fed to the tie resolving circuit output 71 via the mod 2 adder 53, the AND gate 61, and the or gate 69. In the absence of a tie, the majority bit value of the five estimators $E_2$ through $E_6$ which is fed to the tie resolving circuit output 71 is equal to the desired majority bit value of all six estimators $E_1$ through $E_6$.

The electronic switch 31 is arranged to connect a contact of the switch 27 alternatively to the stage $R_1$ of shift register 29 or to the output 71 of the tie resolving circuit 60.

A mod 2 adder 76 has one of its inputs connected to stage $R_1$ of the shift register 29, and a second input 95 is connected to the common terminal of an inversion test mode control switch 93 (which may be operated by the operator, or automatically by circuitry) which connects to the output 71 of the tie resolving circuit 60 to establish mode 1 or to the output 52 of the threshold circuit 51 to establish mode 2. The output of mod 2 adder 76 is connected to an input of an AND gate 77, the output of which is connected to the input of a three-stage counter register 78 within a preset counter circuit 79. The three stages of counter register 78 are respectively connected to inputs of an AND gate 81 contained in the preset counter 79, the output 83 of which is connected to an input of the mod 2 adder 53; to an $a_0$ decoder output 84; to the input of a mod 2 adder 86; and via an inverter 87 to an input of the AND gate 77. The output 71 of the tie resolving circuit 60 is connected to another input of the mod 2 adder 86, and the output 88 thereof constitutes the decoder output for the decoded data bits $a_1$ through $a_{11}$.

A decoder timing circuit 91 is connected to shift the shift register 29 during cycle of loading and decoding a received code word, and also is connected to switch 27 to cause it to connect the decoder input 26 to the shift register input 28 during the time of loading a received code word into the shift register 29, and to cause the switch 27 to connect the shift register input 28 to the common terminal of switch 31 during the subsequent received code word decoding cycle. The timing circuit 91 also has control connections to switch 31, AND gate 77, and counter register 78, as will be described. The decoder timer 91 is synchronized with the decoder timer 15 by suitable well-known means for accomplishing decoder bit and word synchronization, such as described in the book Data Transmission by W. R. Bennett and J. R. Davey (McGraw Hill Book Co., 1965) on pages 260—267.

After an incoming code word is fed into the shift register as described above, the circuits perform a received code word decoding cycle consisting of two subcycles: an inversion testing subcycle, followed by an error correcting subcycle. Before beginning of the inversion testing subcycle, the timing circuit 91 generates initialization control signals for: (1) actuating switch 31 to the position for connecting the $E_1$ bit from stage $R_1$ of shift register 29 to the input 28 (via switch 27) to provide a feedback loop, for the word bits, around the shift register 29, and (2) providing a COUNTER ENABLE "1" bit to the AND gate 77 and (3) providing a COUNTER PRESET pulse to the counter register 78 for presetting it to a binary count representing a nonnegative integer equal to or less than a predetermined maximum initial count. In the particular case in which the inversion test subcycle consists of 10 shift positions and in which the maximum final count is 7 (as shown in FIG. 2), the maximum initial count allowed is unity, because, any larger initial count would result in deciding that the received word was inverted on the basis of less than a majority of the ten inversion test bits. For example, with an initial count of 2, the maximum final count of 7 is reached if only 5 of the 10 inversion test bits disagree with the corresponding received bits. An initial count of unity, obtained by presetting the counter register 78 to the value $h_1h_2h_3$=100, will be used as a basis for the following detailed description. The preferred case in which the inversion testing subcycle of ten shift positions will also be assumed for description convenience.

The operations performed in the adopted example of an inversion testing subcycle are described as follows. During each inversion test position of the shift register 29 (a total of ten shift positions) the mod 2 adder 76 functions to compare its $E_1$ input from shift register stage $R_1$, with its input 95 from the mode control switch 93, which in FIG. 2 is shown connecting to the output 52 of the threshold circuit 51. If these inputs are the same (i.e., both are 1's or 0's) then, in accordance with the rules of modulo 2 addition as described above, the output of mod 2 adder 76 will be 0 and the output of AND gate 77 will also be 0 and hence there will be no input bit to the counter circuit 79. This will be the situation in the absence of errors or inversion of the received word bits. During the first shift position at which the two inputs to the mod 2 adder 76 are different (1 and 0), the output thereof will be 1, and hence the output of the AND gate 77 will be 1 (since the other inputs to this AND gate are 1's as provided by COUNTER ENABLE bit from the timer 91 and by the inverter 87 which inverts the 0 output of the counter circuit 79). This 1 bit from mod 2 adder 76 is fed into the binary counter register 78 causing it to register the binary reading $h_1h_2h_3$=010 representing a total count of two. ($h_1$ is the least significant bit.) Upon the occurrence of a sixth disagreement at the inputs of the mod 2 adder 76, a sixth input bit will be fed to the counter register 78 and it now will contain a full binary count of 111, whereupon all inputs to the AND gate 81 become 1's causing it to produce an output of 1. This 1 output inverted by inverter 87, causes application of a 0 to an input of AND gate 77, whereupon no more input bits can be fed into the counter register 78, thus latching the counter circuit to its full count of binary 111 (decimal seven) and maintaining a 1 output from the counter output 83 until the COUNTER RESET signal from timer 91 resets the counter register 78 to 100. If, during these 10 shift positions of register 29 and the corresponding 10 comparisons by mod 2 adder 76, there have been fewer than six disagreements counted by counter 79, the output 83 of the counter will remain at 0 during the subsequent error-correcting subcycle, whereby the outputs of the mod 2 adders 53 and 86 will be the same as their inputs, respectively, from the threshold circuit output 52 and the tie resolving circuit output 71, so that the decoder output at 88 will consist of serially decoded bits $a_1$ through $a_{11}$ as successively produced from the estimator bits $E_1$—$E_6$ by the decision circuit 41 and tie resolving circuit 60.

If, however, the counter circuit 79 has counted six disagreements out of a maximum of 10 comparisons (a decision threshold of six disagreements allows up to four inversion test failures due to the occurrence of more than two errors in transmission), then it is decided that the received word has become inverted. The basis for this decision procedure is as follows.

The connections of the modulo 2 adder 12 to shift register 11 of the encoder at the transmitter, and the connections of the modulo 2 adders 35—39 to the shift register 29 at the decoder, are such that the estimator bits $E_2$ through $E_6$ will always be the same as the $E_1$ bit in shift register stage $R_1$ in the absence of errors or inversion of a (21, 11) code word. In the event that the bits in the shift register have become inverted, the estimator bit $E_1$ will, of course, be inverted; however the estimator bits $E_2$ through $E_6$ will not become inverted because of the even numbers of input bits to the mod 2 adders 35—39. Because of this property and the fact no received bit is an input bit to more than one of these 5 mod 2 adders, it follows that if $t$ or fewer received bits suffer error in transmission either before or after inversion of the entire 21-bit word, the number of disagreements counted by the preset counter 79 is at least 10-$t$ but no more than 10 provided that $t$ does not exceed 2, the guaranteed error correcting capability provided by 5 "disjoint" estimator functions followed by majority decision. If $t$ exceeds the guaranteed error correcting capability $e$, then the number of inversion test failures is no longer limited to $t$. The purpose of the inversion test mode control switch 93 is to provide a choice of alternative types of disagreement count characteristics in response to errors with $t$ greater than $e$. (Changing the position of this switch has no effect for $t \leq e$.)

The complementation invariance of the bit values of estimator functions $E_2$ through $E_6$ is illustrated by the following example of modulo 2 addition, in which although the 4 bits of the right-hand column are inversions of the 4 bits of the left-hand column, nevertheless the resulting modulo 2 addition remains the same:

| | |
|---|---|
| 1 | 0 |
| 1 | 0 |
| 1 | 0 |
| 0 | 1 |
| 1 | 1 |

The following example shows how an odd number of bits can result in different sums if the bits are inverted;

| | |
|---|---|
| 1 | 0 |
| 1 | 0 |
| 0 | 1 |
| 0 | 1 |

Therefore the assumption that there has been an inversion of the code word bits if the counter 79 counts a sufficient number of disagreements is valid because the mod 2 adder has compared the inverted $E_1$ bits with the uninverted majority representation of the estimator bits $E_2$ through $E_6$.

When an inversion has been detected as described above, the "1" output 83 from the counter 79, applied to inputs of the mod 2 adders 53 and 86, causes the outputs of each of these adders to be inverted with respect to their inputs from the decision circuit 41 and the tie resolving circuit 60, respectively, during the subsequent 11-bit error-correcting subcycle. The inversion caused by the mod 2 adder 86 corrects for the code word inversion.

Following the inversion testing subcycle, and preceding the error-correcting subcycle, the timing circuit 91 actuates switch 31 so that it connects the output 71 of the tie resolving circuit 60 to the input 28 of shift register 29, via the switch 27, as well as supplying a "0" input to the COUNTER ENABLE input of AND gate 77 so as to inhibit the counter input.

During the error-correcting subcycle, the data bits of the code word are initially in stages $R_1$ through $R_{11}$ of the shift register 29, and the above-described decoding procedure is continued for 11 shifts of the shift register 29, whereby the error-corrected decoded 11 bits of the data word are serially fed out at the decoder output 88. The error correcting capability of the coding and decoding system of FIGS. 1 and 2 is generally greater than other systems for inversion tolerant error correction decoding of the (21, 11) code or for noninversion tolerant error correction decoding of the (21, 12) code, because the decoder of FIG. 2 uses six estimators instead of five when decoding data bits $a_1$ through $a_{11}$. The foregoing description of the system operation is based on an inversion testing subcycle of 10 shift positions of the decoding shift register, and an error correcting subcycle of 11 shift positions for a total of 21 shifts which is equal to the code length $n$. An alternative embodiment of the invention achieves increased reliability of inversion testing by providing an inversion testing subcycle of $n$ shift positions and employing a preset counter 79 of larger capacity to allow a larger number of disagreements out of the larger number of $n$ individual inversion test bit comparisons. This alternative requires the use of an alternate encoder that differs only in that the data bits are sent before the redundancy bits instead of after, which merely requires changing the (21, 11) code generator input to the inverter 21 and AND gate 17 from the output 14 of mod 2 adder 12 to the output of stage $R_1$ of the encoder shift register 11.

The decoder of FIG. 2 can also decode the (21, 12) code, but of course without inversion tolerance. Encoding of the (21, 12) code is performed by the encoder of FIG. 1 in a manner similar to that for the (21, 11) code, except for the action of the 12th data bit $a_0$ which causes inversion of the transmitted 21-word bits whenever $a_0$ is 1, as described above with reference to FIG. 1. In decoding the (21, 12) code, the decoder of FIG. 2 functions the same as has been described above for decoding a received code word with a possible inversion and correctable error. During the inversion testing subcycle, if the counter 79 counts six disagreements from the mod 2 adder 76, then the AND gate 81 generates a "1," and during the subsequent error-correction decoding subcycle, this "1" appears at the $a_0$ decoder output 84 and the remaining data bits $a_1$ through $a_{11}$ appear at the output 88, these 12 data bits being the same as the input data bits at the encoder of FIG. 1. Thus, the circuits of the invention achieve the objectives of inversion tolerance and automatic double code capability (alternatively and not simultaneously). The automatic double code capability can be applied to many types of codes in which the encoder inverts some or all of the code word bits in accordance with one or more data bits.

Figure 3:
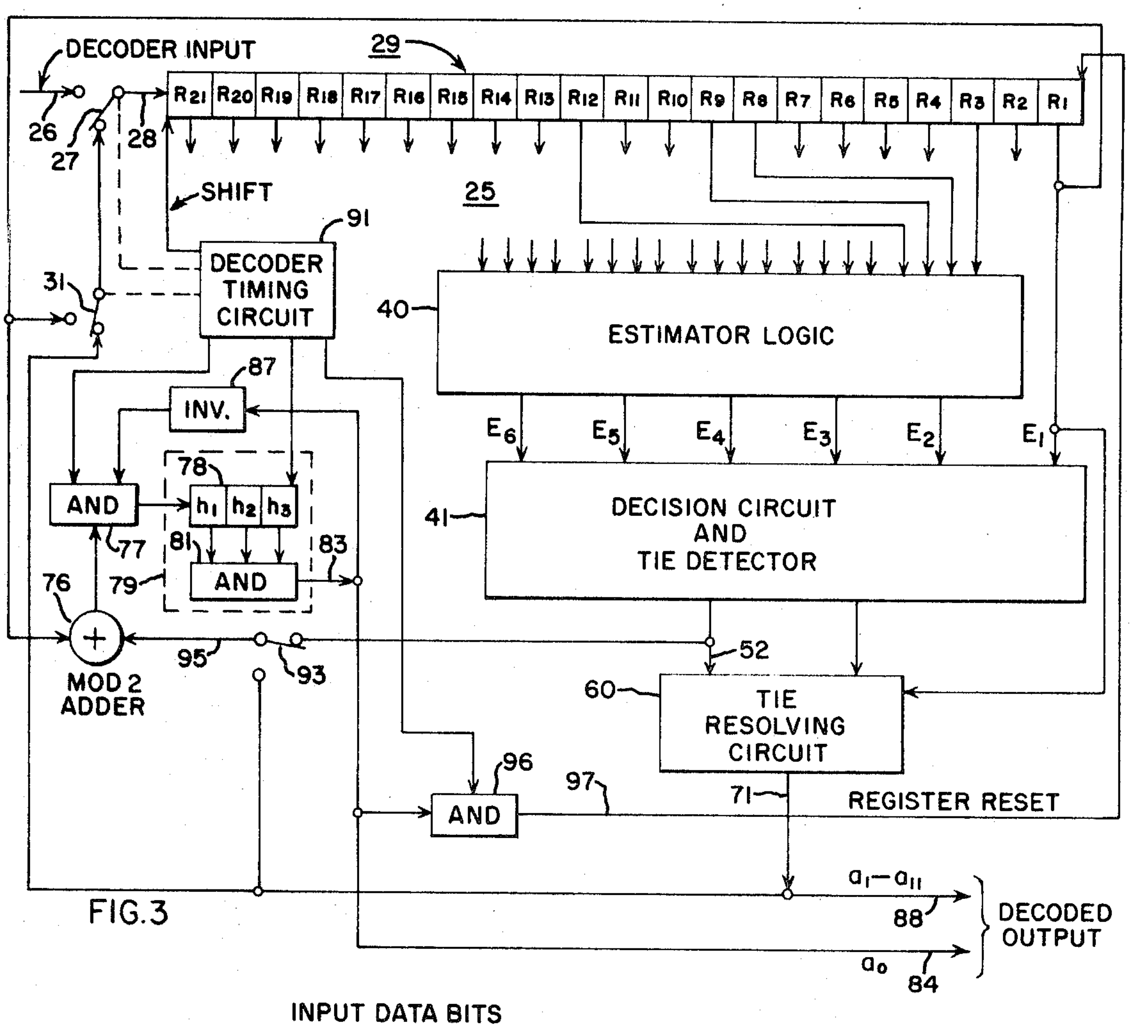
FIG. 3 is an electrical block diagram of an alternative embodiment of the invention.

The decoder of FIG. 3 performs the same overall function as that of FIG. 2, and is the same as FIG. 2 except that instead of the mod 2 adders 53 and 86, it employs an AND gate 96 having inputs connected to the timer 91 and the output 83 of AND gate 81, and having its output 97 connected to a complement (inversion) terminal of the shift register 29. During the inversion testing subcycle the procedure of comparing estimator bits and counting disagreements is the same as has been described for FIG. 2, and, if the counter 79 counts enough disagreements for indicating an inversion, the resulting "1" output from AND gate 81 is applied to the AND gate 96, and is maintained until the end of the inversion testing subcycle, at which time the other input to AND gate 96 from the timer 91 becomes a "1," so that this AND gate 96 feeds a "1" to the complementing input of shift register 29 to simultaneously complement the contents of all stages, thus correcting for the inversion, so that during the following error-correcting decoding subcycle the register contents will be uninverted. The circuit of FIG. 3 has a double code capability, and decodes the (21, 12) code in the manner described above. The circuit of FIG. 3 is more economical than that of FIG. 2 for use with codes having a relatively small number of bits per word, because of its one AND circuit 96 instead of the two mod 2 adders 53 and 86 of FIG. 2. However, for codes having a large number of bits per word, and hence requiring a large number of stages in shift register 29, FIG. 2 is more economical because its shift register 29 does not require complementing circuits for each stage as are required in the circuit of FIG. 3.

While preferred embodiments of the invention have been shown and described, various other embodiments and modifications thereof will become apparent to persons skilled in the art, and will fall within the scope of the invention as defined in the following claims.

I claim:

1. An error-correcting decoder circuit for decoding a received coded word made up of data code bits and redundant bits, comprising storage means for storing the bits of said coded word, means connected to said storage means for generating a plurality of sets of estimator bits each set of which is derived from an even number of selected bits of said coded word, and each set of said plurality of estimator bits being indicative of a code bit within said storage means, a decision circuit connected to receive each set of said plurality of estimator bits and to produce a test bit derived with the aid of each set of said plurality of estimator bits, and means for causing repetitive shifting of said coded word within said storage means to successively generate each set of said plurality of estimator bits and corresponding test bits, wherein the improvement comprises comparison means connected to successively compare said test bits with a corresponding code bit within said storage means and to provide a disagreement indication upon each disagreement thereof, counting means connected to count the number of said disagreement indications and to produce an inversion indicating signal whenever the counted number of said disagreement indications reaches a predetermined value, and inversion means connected to said counting means and being responsive to said inversion indicating signal for causing inversion of the output of said decoder circuit.

2. A decoder circuit as claimed in claim 1, in which said comparison means comprises a modulo 2 adder circuit.

3. A decoder circuit as claimed in claim 1, in which said coded word comprises a plurality of redundant bits followed by a plurality of data bits, and including timing means for terminating said counting of disagreements after a predetermined number of shifts of said coded word within said storage means, said shifting and counting of disagreements constituting a first subcycle of operation, followed by a second subcycle constituting continued repetitive production of each set of said plurality of estimator bits and said corresponding test bits, said decoder circuit further including an output circuit connected to said counting means, said output circuit being utilized for deriving decoded data output signals with the aid of said test bits during said second subcycle.

4. A decoder circuit as claimed in claim 3, in which said means for causing inversion of the decoded output comprises an inversion circuit connected in said output circuit to cause inversion of the decoded data bits during said second subcycle whenever said inversion indicating signal is produced during the first subcycle.

5. A decoder circuit as claimed in claim 4, in which said inversion circuit comprises a modulo 2 adder circuit.

6. A decoder circuit as claimed in claim 3, in which said means for causing inversion of the decoded output comprises means connected to invert the contents of said storage means prior to said second subcycle upon the occurrence of said inversion indicating signal from the first subcycle.

7. A decoder circuit as claimed in claim 1, including means for feeding successive code bits within a certain stage of said storage means to said decision circuit, said decision circuit including means for utilizing said successive code bits as estimator bits in producing said corresponding test bit.

8. A decoder circuit as claimed in claim 1, including means for feeding successive code bits within a certain stage of said storage means to said decision circuit, said decision circuit including means for utilizing said successive code bits as estimator bits in producing said output of the decoder circuit.

9. A decoder circuit as claimed in claim 1, having a double code capability for decoding an alternative type of coded word in which the words are selectively inverted in accordance with an additional data bit, said decoder circuit including output means for providing said inversion indicating signal constituting the decoded additional data bit.

10. An encoder circuit having a double code capability for producing alternative types of coded words, wherein the improvement comprises coding means for generating a redundantly coded word from a plurality of data input bits, input means for an additional input bit being connected to said coding means, means interconnected with said input means and said coding means for causing selective inversion and noninversion of said redundantly coded word in accordance with said additional input bit thereby providing an alternative type of coded word in lieu of said first-mentioned redundantly coded word.